United States Patent [19]

Wihk

[11] Patent Number: 5,701,069

[45] Date of Patent: Dec. 23, 1997

[54] METHOD AND DEVICE FOR CHARGING LEAD ACCUMULATORS

[75] Inventor: Bernt E L Wihk, Malmö, Sweden

[73] Assignee: Livingstones Patenter AB, Sweden

[21] Appl. No.: 553,484

[22] PCT Filed: May 24, 1994

[86] PCT No.: PCT/SE94/00479

§ 371 Date: Jan. 3, 1996

§ 102(e) Date: Jan. 3, 1996

[87] PCT Pub. No.: WO94/28610

PCT Pub. Date: Dec. 8, 1994

[30] Foreign Application Priority Data

May 24, 1993 [SE] Sweden .............................. 9301756-4

[51] Int. Cl.⁶ .............................................. H01M 10/44
[52] U.S. Cl. ............................................. 320/21; 320/14
[58] Field of Search .................................. 320/14, 21, 27;
313/24 R, 239

[56] References Cited

U.S. PATENT DOCUMENTS

| 3,487,282 | 12/1969 | Cady | 320/20 |
| 3,510,746 | 5/1970 | Furuishi et al. | 320/39 |
| 3,700,997 | 10/1972 | Smith | 320/20 |
| 3,890,556 | 6/1975 | Melling et al. | 320/21 |
| 3,936,718 | 2/1976 | Melling et al. | 320/20 |
| 4,385,269 | 5/1983 | Aspinwall et al. | 320/14 |
| 5,307,000 | 4/1994 | Podrazhansky et al. | 320/14 |

FOREIGN PATENT DOCUMENTS

| 0005841 | 12/1979 | European Pat. Off. | H02J 7/04 |
| 0121325 | 10/1984 | European Pat. Off. | H02J 7/04 |
| 0314155 | 5/1989 | European Pat. Off. | H02J 7/00 |
| 0584362 | 3/1994 | European Pat. Off. | H02J 7/04 |
| 1588540 | 10/1970 | Germany | H02J 7/10 |
| 2557010 | 6/1977 | Germany | H02J 7/10 |

Primary Examiner—Peter S. Wong
Assistant Examiner—Gregory J. Toatlly, Jr.
Attorney, Agent, or Firm—Ladas & Parry

[57] ABSTRACT

According to the invention, lead storage batteries are charged by intermittently switching on and off a battery-charging unit (1, 2, 3) which is connected to a battery. The on and off times are suitably about 1 second when charging a battery. In the case of a maintenance charge, it is suitable to charge the battery with pulses in the region of a mains voltage period, with pauses of about 10 seconds. The circuit is suitably broken by means of a switch (4, 5) on the primary side of the transformer (1, 2). The switch may have the form of a relay with associated time circuit (4), although it is preferred to use a triac.

11 Claims, 2 Drawing Sheets 5,701,069

METHOD AND DEVICE FOR CHARGING LEAD ACCUMULATORS

BACKGROUND OF THE INVENTION

The present invention relates to a method and to a device for charging lead batteries in accordance with the preamble of the following Claims 1 and 5 respectively.

The active substance of a charged lead battery is found in the positive electrodes of lead superoxide $PbO_2$, and in the porous, metallic-lead negative electrodes. When the battery is discharged, these active substances are converted to lead sulfate $PbSO_4$, wherein sulfate ions are taken from the electrolyte, which is sulfuric acid. The process is, in principle, the reverse when charging the battery. However, the circumstances are complicated and still not fully understood. It is known, however, that it is not possible for all lead superoxide and all metallic lead to be converted completely as the battery is discharged, among other things because the changes in the volume of the electrodes would cause the electrodes to burst. The maximum current accumulation is therefore determined by the amount of sulfuric acid that is consumed between, for instance, the specific gravities of about 1.28 and 1.18. One particular complication is that the discharge product of both types of electrode are extremely difficult to dissolve. The solubility of $PbSO_4$ in water is given as $10^{-5}$ mol/l, and 40 mg/l respectively, and is even less soluble in sulfuric acid, and consequently the electrolyte contains a particularly low quantity of $Pb^{++}$. The limitation of lead batteries, both when charging and discharging, has therefore been considered to lie in the diffusion of the divalent lead ions. Furthermore, lead sulfate is a very poor conductor of electricity. These circumstances often result in problems when charging lead batteries, which, among other things, are in danger of being destroyed by inactive lead-sulfate layers which either prevent the battery from being charged or reduce its charge capacity and gradually render the battery unusable. The aforesaid problems of different densities prior and subsequent to charging the battery with subsequent dimensional changes are additional problems which give rise to sludge and also weaken the battery mechanically.

There is a general and deep-rooted opinion, based on experience, that lead batteries should preferably be charged comparatively slowly, for instance a 75 Ah? car battery should be charged from a low state to a fully charged state in the order of 10 hours. So-called normal quick charging results in higher temperatures and reduces the useful lifetime of the battery. This opinion is quite correct when the battery is charged in a conventional manner.

SUMMARY OF THE INVENTION

However, it has surprisingly been found in accordance with the invention that lead batteries can be charged with high electric currents and with very good results with no appreciable increase in temperature where the battery is charged over short time intervals that are interrupted with time intervals during which no charge is applied. One object of the invention is to enable batteries to be charged quickly. Another object of the invention is to provide a relatively inexpensive battery charger which is capable of charging a battery more quickly and more effectively than has hitherto been possible, without harming the battery. Another object is to enable a practical and effective maintenance charge to be obtained.

Accordingly, there is applied in accordance with the invention a direct current, normally a half-wave rectified alternating voltage from a conventional charging unit in intermittent current supplying periods which are interrupted by periods in which no current is supplied, these periods having a duration of between 0.5 and 10 seconds, preferably between 0.5 and 1.5 seconds. When charging a battery, the current supply intervals and the pause intervals will suitably have roughly the same duration. On the other hand, in the case of maintenance charging, the current supply periods will preferably be very short and, in accordance with one preferred embodiment of the invention, will have a duration of from one-half to one full period of the mains voltage. However, it may be more purposeful in the case of some battery charging units for this time period not to be shorter than some tenths of a second in duration. In the case of a maintenance charge, the main thing is to charge the battery over short charging periods between relatively long time intervals while applying a current pulse of such magnitude as to keep any impairment of the battery in check. If a triac is used, the triac is suitably fired after a zero transition and extinguished with the next following zero transition, meaning that current will be conducted through at most one-half period in the case of a half wave rectifying unit. In this case, the pause periods are given a much longer duration, for instance a duration of 10 seconds or still longer. The current should reach at least 4 A, preferably at least 6 A during the current supply periods. When the battery is stored over the winter months, it should be expected that the battery will need to be filled with water at some time.?

Without wishing to limit the invention in this respect, it is assumed at present that the inventive effect is concerned with the development that occurs when charging respective oxygen of gases at the positive pole and hydrogen gases at the negative pole, which have the properties associated with the term "in statu nascendi", results in a particular activity which enables lead sulfate to be converted to lead and lead superoxide more easily. This probably concerns surface effects of a more or less microscopic nature which are very difficult to observe experimentally, and also such solid-state effects, crystalline structure effects, etc., of a transient nature over which it is at best only possible to speculate on with the present-day scientific standpoints.

The concept of charging lead batteries with pulsated current is not new in itself. For instance, so-called "Pulstronic" devices are commercially available which deliver a pulsating charge at 20 kHz and 90 kHz respectively and with which a flat car battery can be fully charged in about 5 hours. As will be understood, a device of this kind is, of necessity, relatively expensive. Neither is it possible to dissolve sulfation as made possible by the present invention.

The quick charging of a storage battery made possible by the invention, with essentially imperceptible heating of the battery is not, however, achieved with this known technique. It is therefore assumed that in the case of the present invention, one has been successful in utilizing a "chemical time constant" which has a relationship with the course of events that take place when charging a storage battery. It is known that time constants occur when discharging lead storage batteries: When a fully charged battery begins to discharge, the voltage drops from about 2.2 V per cell to about 1.83 V over the first 10 seconds, and then increases exponentially by nearly 0.1 V with a time constant of approximately 10 seconds. It is generally thought that this is due to supersaturation of lead sulfate in the absence of condensation caused in the form of lead sulfate crystals.

In the case of a device for charging lead storage batteries in accordance with the principles of the present invention, it is convenient to allow commutation to take place by breaking an automatic switch and closing the current in the primary winding of the transformer, the transformed current of which is rectified. It has been found that there is then obtained an initial current pulse of good effect. In the case of one particular embodiment for three-phase mains voltage, it has also been found suitable to break and close only one of the phase lines so that a certain smaller charge current will remain during the pause periods.

The present invention can be used to particular benefit to recondition storage batteries that have been used over a long period of time and have lost their efficiency due to sulfation. In such cases, the cells have different conditions and the following procedure should be followed in order to "freshen-up" the cells. The battery is charged until the acid content of the "best" cells reaches a normal value. The battery is then discharged through an appropriately selected resistance and then recharged. The "poor" cells are improved each time this procedure is undertaken and from the aspect of use, the battery is often as good as new after three to five such cycles. This reconditioning process has been found to provide good results even in the case of very large storage batteries, for instance batteries for powering electric trucks, where serious problems otherwise exist and the battery costs are high. The invention thus enables considerable savings in costs to be achieved.

BRIEF DESCRIPTION OF THE DRAWINGS

The invention will now be described in more detail with reference to an exemplifying embodiment thereof and with reference to the accompanying drawings, in which.

DESCRIPTION OF PREFERRED EMBODIMENTS

Figure 1:
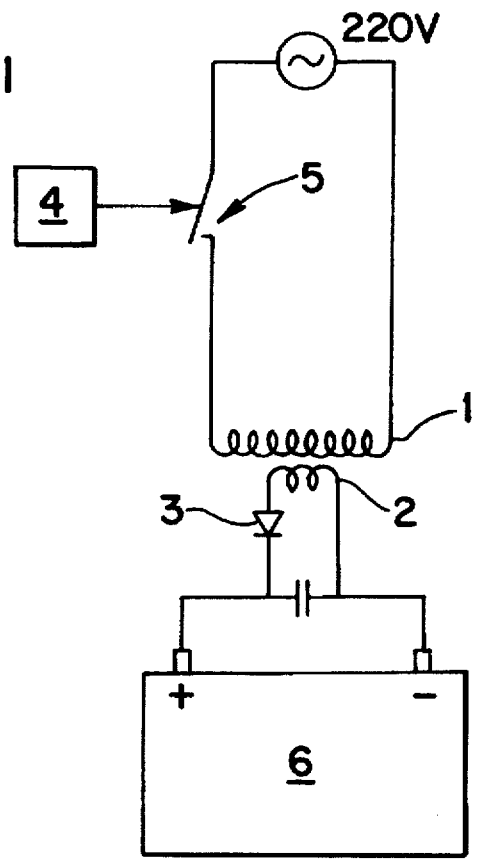
FIG. 1 illustrates schematically a device by means of which the method can be applied.

FIG. 1 illustrates the principle device for charging a lead storage battery. A transformer 1, 2 is supplied with mains voltage on the primary side 1 and current from the secondary side 2 is rectified, in the simplest case by one single diode 3. The rectified current is delivered to a storage battery 6. There is normally included a current measuring instrument, which may be a conventional soft-iron instrument (not shown). In the illustrated case, the periodic supply of current to the battery 6 is effected with the aid of a switching drive circuit 4 and a switch 5 which switches the primary voltage on and off and which is considered to provide the simplest means of achieving the periodic supply. This can be achieved with a simple relay having suitable drive circuits, although it is preferred to use some form of thyristor switch 12 since there is then no need to worry about wear on the contacts.

Figure 2:
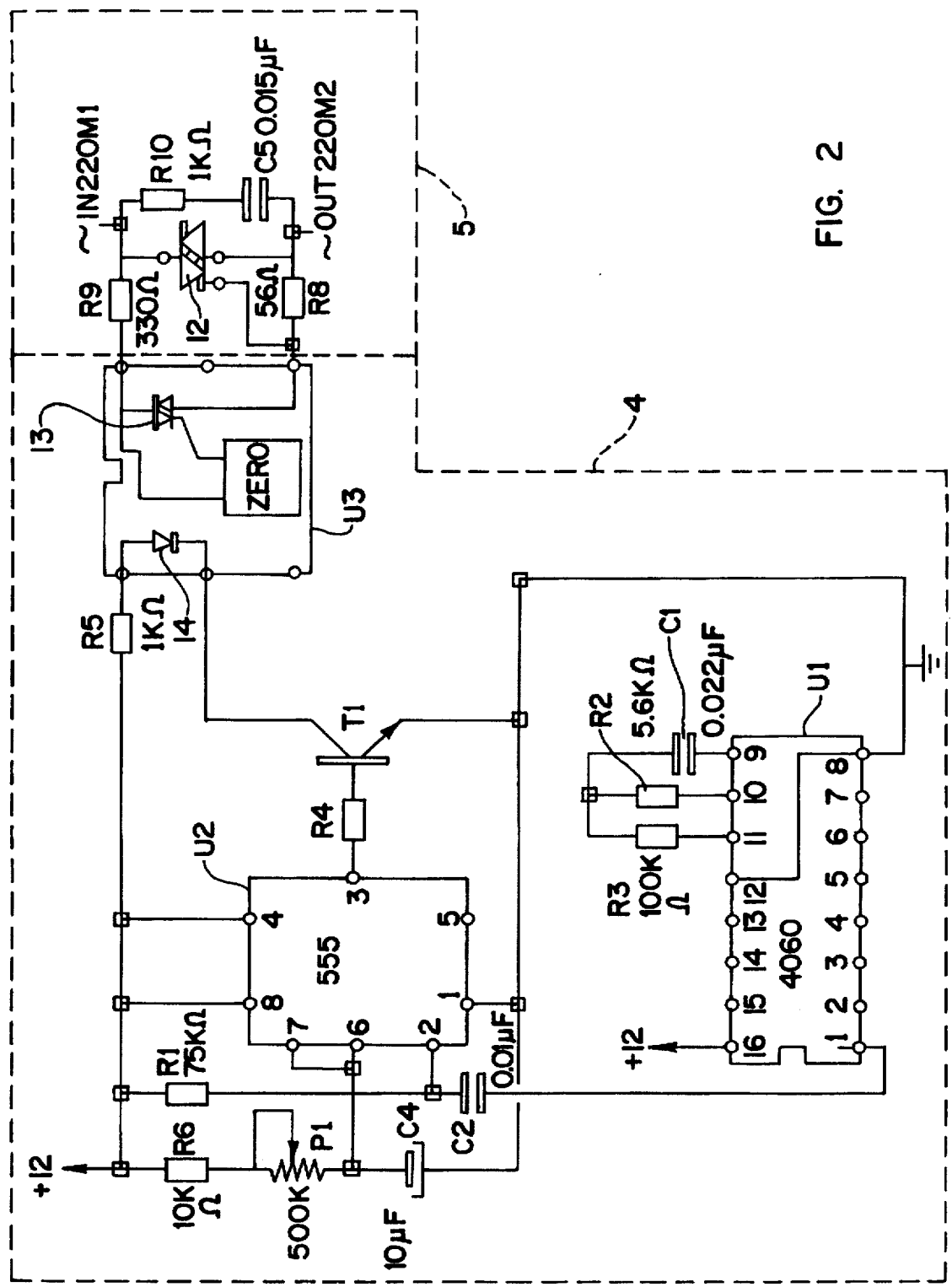
FIG. 2 is a circuit diagram for a pulsating device which can be connected to the input side of a conventional charging unit when practicing the invention.

In a preferred embodiment, which is a modification of the FIG. 2 embodiment, the potentiometer P1 is replaced with two switchable resistors having respectively a resistance of 10 kohm for a charging time of 0.5 seconds and a resistance of 25 kohm for a charging time of 1 second. The switch is suitably made at the same time as the output on 4060 is switched from pin 1 ($Q_{12}$) to pin 3 ($Q_{14}$), which makes the time interval four times longer.

By switching resistors and output contact simultaneously, it is possible to switch from a state in which the battery is charged over a period of 1 second and a pause period of 1 second, to a battery-charging maintaining state in which the batteries charged for 0.5 seconds with pauses of 7.5 seconds. It will be understood that these are only examples of conceivable times and switching procedures, and that the times can be set to any selected values, particularly when the capacitor connected to pin 9 on 4060 is increased so as to enable the whole of the dividing interval of the circuit to be used, said circuit having outputs for division with fourteen powers of two.

Figure 3:
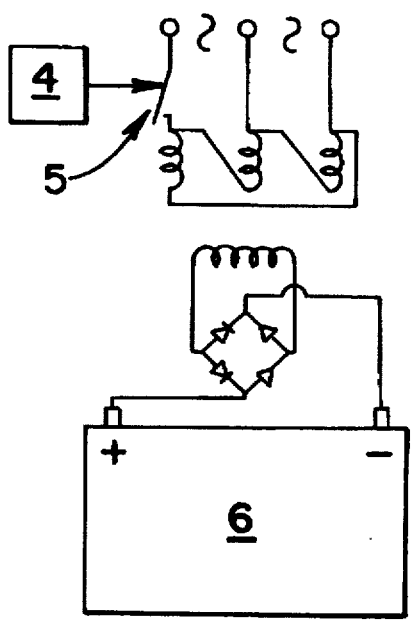
FIG. 3 is a circuit diagram for connection to a three-phase system.

The activation variant shown in FIG. 3 has a three-phase transformer and a rectifier. In this variant, a contact breaker is placed only on one of the incoming three-phase lines. This has been found to work very effectively, since the direct current delivered to the battery while only two phase lines are connected or engaged is sufficiently low so as not to heat the battery. Without wishing to limit the invention to this explanation, it is assumed that the residual voltage influences the charging sequence through an adequate polarization voltage.

The invention will now be described with reference to a number of working examples based on experiences obtained when charging lead storage batteries in accordance with the principles of the invention.

EXAMPLE 1

A flat car storage battery (acid density 1.18) of 75 Ah was charged with on-times and off-times of 1 second duration, and a charging current (effective value measured with a soft-iron instrument) of 90 A. The battery did not heat to any appreciable extent. Gas was generated from the beginning. After 25 minutes, the battery was found to be fully charged with an acid density of 1.28. The acid densities were measured with a refractive-index measuring device.

The battery was then discharged with a current of roughly 8 A, wherein the current was measured and integrated continuously, wherein a value of 68 Ah was obtained down to the same state of discharge.

When charging the same battery with a continuous charge, it was not possible to supply more than 7 A without the battery becoming very hot.

EXAMPLE II

An approximately similar flat or discharged battery, this time 60 Ah, was charged with charging periods and pauses of 1 second duration and with a charging current of 12 A, which finally fell to 10 A. The battery was found to be fully charged after 2 hours.

EXAMPLE II

Several car batteries, 60–75 Ah, which had stood for 6–12 months without maintenance charge and therefore heavily sulfated were test-charged according to EXAMPLE II. 80% of the batteries were found to accept a charge and appeared fully normal. Among the unsuccessful batteries, some were found to be seriously damaged by vibrations from diesel engines.

EXAMPLE IV

Four so-called closed flat or exhausted car batteries were test-charged according to EXAMPLE II. All of the batteries accepted charge with the exception of one and remained cold. One of the batteries became hot. A closer inspection of this battery showed that one of its cells was short-circuited.

EXAMPLE V

A test was carried out on 1,000 batteries over a long period of time, these batteries being between 5 and 15 years old and having capacities between 55 and 700 Ah. Prior to regeneration, the distribution was as follows:

| Number | Acid Density | Capacity |
|---|---|---|
| 671 | 1.00–1.10 | 0–18% |
| 303 | 1.11–1.18 | 19–33% |
| 19 | 1.19–1.24 | 34–42% |
| 7 | 1.25–1.26 | 43–57% |

The following results were obtained when testing with conventional battery-charging procedures:

| Number | Acid Density | Capacity |
|---|---|---|
| 26 | 1.27–1.28 | 100% |
| 974 | Unchanged | Unchanged |

The following results were obtained when regenerating in accordance with the invention:

| Number | Acid Density | Capacity |
|---|---|---|
| 786 | 1.28–1.30 | 100% |
| 188 | 1.00–1.02 | 0% (mechanical fault) |

Experience has shown that the problem of sulfation is totally eliminated when the invention is used to charge storage batteries on a regular basis.

In earlier experiments with the invention, there was used a conventional battery charger (half-wave rectification) in combination with a relay for opening and closing the connection with the primary current source. Although this battery charger worked well for a long time, the electrical contacts gradually burned out. It is therefore preferred to use a triac with associated control circuits for opening and closing a connection in series with the primary winding of the battery charging device. In this regard, commutation is suitably zero-transition controlled.

It lies within the nature of things to use preferably current sources having much larger charging currents than as hitherto been usual. It is true that a certain increased current pulse is obtained when switching on the primary side, although the full effect of the invention is not achieved unless the maximum current is increased to much higher values than those that have been normal hitherto.

The experiments carried out with the present invention have been directed primarily to car batteries, which are easy to obtain in different states of neglect. However, systems exist which have permanently fixed batteries, for instance batteries which supply telephone networks, emergency systems, etc., where sulfation problems and similar problems are difficult to resolve, primarily problems relating to maintenance. The invention also enables savings to be made in this regard by improved maintenance, and not least by improved safety with regard to those systems which are used primarily as back-up systems.

I claim:

1. A method for charging lead storage batteries, comprising applying a varying direct voltage from a battery-charging unit which is sufficient to generate gassing at the positive and negative pole, characterized in that this gassing is achieved by applying the direct voltage in intermittent current supply periods that are interrupted with pauses in which no current is supplied, having durations of between about 0.5 seconds and about 10 seconds wherein the current supplied to the battery is non-negative throughout the method.

2. A method according to claim 1, characterized in that the current supply periods and the pauses have generally the same durations.

3. A method according to claim 1 for regenerating batteries whose cells are in mutually different states, characterized by charging, discharging and charging the battery several times until all of its cells have been regenerated.

4. A device for charging lead storage batteries comprising a transformer having a primary winding for connection to the electrical main, a secondary winding, a rectifier connected to the secondary winding, and a positive and a negative terminal intended for connection to a battery to be charged, characterized by an automatic switch means connected to the primary winding for selectively coupling the main on and off intermittently to the primary winding with short battery-charging periods interrupted by pauses in which no current is supplied, having durations of from 0.5 to 10 seconds, wherein said battery charging periods and said pauses between these charging periods are sufficient to generate gassing at the positive and negative pole in said batteries and the supplied current is non-negative.

5. A device according to claim 4, characterized in that the switch means is adapted to switch the mains network on and off over time periods of essentially equal durations.

6. A device according to claim 4, characterized in that the switch means includes a two-way extinguishable semiconductor valve which functions as a single-pole switch.

7. A device according to any one of claims 4–6, characterized in that the transformer has three primary windings intended for connection to a three-phase network; and in that the switch means is connected between the three-phase network and the transformer in one of the phase conductors.

8. A method for charging lead storage batteries, comprising applying a varying direct voltage from a battery-charging unit which is sufficient to generate gassing at the positive and negative pole, characterized in that this gassing is achieved by applying the direct voltage in intermittent current supply periods that are interrupted with pauses in which no current is supplied, the current supply periods and the pauses having durations of from 0.5 to 1.5 seconds, wherein the supplied current is non-negative.

9. A method for maintaining the charge of fully charged lead storage batteries, comprising applying a varying direct voltage from a battery-charging unit which is sufficient to generate gassing at the positive and negative pole, characterized in that this gassing is achieved by applying the direct voltage in intermittent current supply periods that are interrupted with pauses in which no current is supplied, the intermittent current supply pulses having a duration of not more than one-half second, and the pauses having durations of from 0.5 to 10 seconds, wherein the supplied current is non-negative.

10. A device for charging lead storage batteries comprising a transformer having a primary winding for connection to the electrical main, a secondary winding, a rectifier connected to the secondary winding, and a positive and a negative terminal intended for connection to a battery to be charged, characterized by an automatic switch means connected to the primary winding for selectively coupling the electrical main on and off intermittently to the primary winding with short battery-charging periods interrupted by pauses in which no current is supplied, the switch means being set between a battery charging state in which the activation time periods are from 0.5 to 10 seconds duration, and a battery charge-maintaining state in which the charge-maintaining periods have a maximum duration of 0.5 seconds, wherein said battery charging periods and said pauses between these charging periods are sufficient to generate gassing at the positive and negative pole in said batteries and the supplied current is non-negative.

11. A method as claimed in claim 1, wherein during the pauses the current is substantially zero.

* * * * *